United States Patent [19]

Shirai et al.

[11] Patent Number: 4,626,183
[45] Date of Patent: Dec. 2, 1986

[54] APPARATUS FOR PRODUCING THERMOPLASTIC RESIN FOAM

[75] Inventors: Hideharu Shirai; Yoshifumi Nakahara, both of Nara, Japan

[73] Assignee: Sekisui Kaseihin Kogyo Kabushiki Kaisha, Nara, Japan

[21] Appl. No.: 584,355

[22] Filed: Feb. 28, 1984

[51] Int. Cl.⁴ .................. B29C 47/00; B29C 47/92
[52] U.S. Cl. .................. 425/68; 264/45.9; 264/46.1; 264/102; 264/514; 264/566; 264/568; 425/183; 425/381; 425/466; 425/DIG. 19
[58] Field of Search ............ 264/45.2, 45.9, 46.1, 264/51, 53, 54, 101, 102, 514, 566, 568, 555; 425/4 C, 4 R, 381, 465, 466, DIG. 19, 68, 183; 156/244.21

[56] References Cited

U.S. PATENT DOCUMENTS

| 3,135,998 | 6/1964 | Fowler, Jr. et al. | 425/DIG. 19 |
| 3,822,331 | 7/1974 | Cogliano | 264/54 |
| 4,247,271 | 1/1981 | Yonekura et al. | 425/68 |
| 4,462,242 | 7/1984 | Morgenthaler | 425/183 |

Primary Examiner—Jay H. Woo
Assistant Examiner—Timothy W. Heitbrink
Attorney, Agent, or Firm—Armstrong, Nikaido, Marmelstein & Kubovcik

[57] ABSTRACT

Apparatus including an extruder, a die member and a vacuum device connected in series. The vacuum device includes a chamber and a device at at least the outlet thereof to air-tightly seal the chamber around the extruded mass of foamed thermoplastic resin. The air-shielding or sealing device is an annular tube which is inflatable radially inwardly having a flexible inner face which seals around the extruded mass. A durable, abrasion-resistant, flexible protective sheet can be interposed between the mass and the tube.

6 Claims, 8 Drawing Figures

APPARATUS FOR PRODUCING THERMOPLASTIC RESIN FOAM

BACKGROUND OF THE INVENTION

This invention relates to an apparatus for producing a thermoplastic resin foam.

It has been known that the thermoplastic resin foam can be effectively produced, continuously, by means of an extrusion method. (Therefore, it has been usual to use the extrusion method for this purpose.) In this case, in order to obtain a highly expanded foam, an extrudate is usually introduced immediately into a vacuum chamber connected to a die member of the extruder to enhance the expansion of the foam under reduced pressure. In such a case, the foam accomplished expansion is produced continuously from the outlet of the vacuum chamber. Therefore, it is necessary to prevent air from being introduced into the reduced pressure device through an annular gap possibly formed between an outer surface of the foam and an inner wall of an outlet hole of the vacuum chamber. In order to realize the prevention of air immigration into the vacuum chamber, U.S. Pat. No. 3,822,331 discloses either a flexible flap on an outer end wall of the chamber or a flexible ring packing provided on an inner wall of the outlet hole of the chamber which acts to prevent air from passing through an annular gap between the inner wall of the hole and the outer periphery of the extruded resin foam.

The flexible packing is of natural or synthetic rubber or soft resin and is provided so that it covers the outlet hole of the chamber except a center portion thereof through which the extruded resin passes against a resilient force acting to minimize the open area of the center portion. It has been found that such packing provided in the outlet of the chamber is insufficient to provide a satisfactory air tightness thereof. That is, during a run of foam expansion, the volume of the foam increases at one variable rate and thus the cross-sectional configuration and size of the foam are not always constant. The packing itself cannot follow these physical variations of the foam. Therefore, it has been desired to improve the air tightness of the outlet of the vacuum chamber.

SUMMARY OF THE INVENTION

This invention was made in view of the above mentioned state of the art.

In order to obtain a good air tightness of the outlet and/or inlet of the vacuum chamber, the inventor has developed a cylinder made from a flexible sheet material which is disposed at the outlet and/or inlet of the vacuum chamber such that the extruded resin foam passes through the flexible cylinder.

Further, an air chamber is provided around the flexible cylinder so that, when pressurized air is introduced into the air chamber, the flexible cylinder is inflated radially inwardly to eliminate the annular air gap between the outer surface of the extruded resin foam and the inner wall of the outlet and/or inlet hole of the vacuum chamber.

It has been confirmed that the above air shielding construction provides a good result. Therefore, the present invention resides in an apparatus for producing thermoplastic resin foam, comprising a series connection of an extruder, a die and a vacuum chamber, the vacuum chamber including a cylinder body and an air shielding device provided at least one end of the cylinder body, the air shielding device comprising an annular tube having an inside wall formed of a flexible sheet, the flexible sheet being capable of being inflated radially inwardly by a pressurized fluid introduced into the annular tube.

In the above construction of the apparatus, it is possible to maintain an interior of the vacuum chamber at reduced pressure when the extruded resin foam is slidingly moved over the surface of the flexible sheet. However, the flexible sheet is abraded by the extruded and foamed resin and easily worn out. Therefore, it is necessary to periodically replace the sheet with a new one at short intervals of time. Since it is impossible to use the vacuum chamber during the replacement of the flexible sheet, the extrusion which operates inherently continuously must be stopped. Thus, the frequent replacement of the flexible sheet produces new problems. In order to resolve the problem, an improvement was made on the basis of a fact that, by providing a protective sheet such as a metal mesh which is durable against abrasion on an outer surface of the flexible sheet which is adapted to be in contact with the extruded resin foam so that the protective sheet directly contacts with the latter, it is possible to totally maintain the air tightness with an improved abrasion durability of the sheet.

Therefore, the present invention resides also in the apparatus as mentioned above, wherein a flexible protective sheet is provided on the flexible sheet so that the flexible sheet, together with the flexible protective sheet, is inflated by a pressurized fluid introduced into the air shielding device, with only the protective sheet being in direct contact with the foamed resin.

BRIEF DESCRIPTION OF THE DRAWINGS

The above mentioned apparatus of the present invention will be described with reference to the accompanying drawings.

DETAILED DESCRIPTION OF THE PREFERRED EMBODIMENTS

Figure 1:
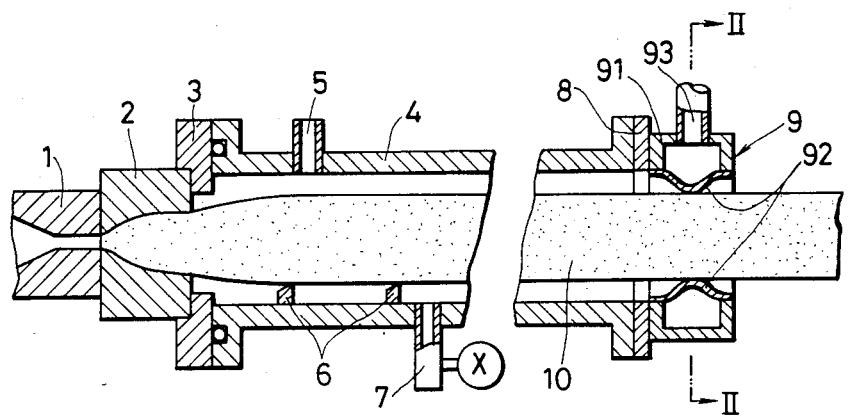
FIG. 1 is a cross-sectional view showing an embodiment of the present invention.
Figure 2:
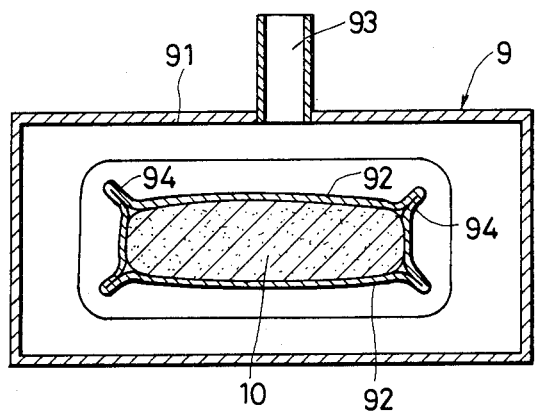
FIG. 2 is an enlarged cross-sectional view taken along a line II—II in FIG. 1.

In FIGS. 1 and 2, a reference numeral 1 depicts a die, 2 a sizing die, 3 a connecting plate, 4 a vacuum chamber, 5 a vacuum suction inlet, 6 a support for a foamed resin, 7 a pressure regulator valve, 8 a connecting plate, 9 an air-shielding device, and 10 an extruded and foamed resin. The air-shielding device 9 comprises a frame 91, a flexible sheet 92, and a pressurized fluid inlet 93.

In the apparatus shown in FIG. 1, the sizing die 2 is provided at an end of the die 1 which is fixedly secured to any conventional extruder (not shown), to which an outer end of the vacuum chamber 4 is connected.

In the shown embodiment, there may be no need of an air-shielding at an inlet side of the vacuum chamber 4 since it is connected air-tightly through the connecting plate 3 to the sizing die 2. However, there may be a case where the extruded resin from the die 1 is firstly exposed under atmosphere and then introduced into the vacuum chamber 4. In such a case it is necessary to provide the air-shielding device even in the inlet side of the vacuum chamber 4.

In any case, however, the outlet side of the vacuum chamber must be opened to derive an extruded and foamed resin. Therefore, it is always necessary to provide an air-shield at the outlet side thereof. In order to do so, the air-shielding device 9 is provided in the outlet side of the vacuum chamber 4.

The frame 91 takes an annular form so that the extruded and foamed resin can pass through the center portion thereof. An outer configuration of the frame 91 should be determined such that it can cover the outlet and/or inlet hole of the vacuum chamber 4. Further, the frame 91 has a U-shaped cross-section when taken along an axis thereof, with the inside surface portion thereof being open. The inside annular surface portion means a surface which faces the surface of the extruded and foamed resin passing through the annular frame. The fluid pressure inlet 93 is provided at a suitable portion of an outer surface of the frame 91. The frame 91 may be of any rigid material and, preferably, of a metal material.

By fixedly securing the frame 91 at one side thereof to the outlet of the cylinder body constituting the vacuum chamber 4, the outlet of the cylinder body is opened indirectly through the center hole defined by the flexible sheet 92 to atmosphere. Further, by introducing a pressurized fluid such as pressurized air through the fluid inlet 93 into the frame 91, the flexible sheet 92 is inflated inwardly to reduce the cross-sectional area of the center hole. Therefore, when the extruded and foamed resin 10 is passing through the hole, the inner surface of the flexible sheet 92 contacts the surface of the extruded and foamed resin 10.

FIG. 2 shows the hole in cross-section under the latter conditions. That is, the surface of the flexible sheet 92 is in intimate contact with the surface of the extruded and foamed resin 10 except portions thereof corresponding to corners 94 of the flexible sheet 92 where it is folded. However, the folding thereof is made very tight and, therefore, there is substantially no leakage of air therethrough.

The flexible sheet 92 may be of natural or synthetic rubber or soft synthetic resin, etc. The synthetic rubber may include chloroprene rubber, ethylene-propylene rubber, styrene-butadiene rubber, urethane rubber, silicon rubber and fluoro rubber, etc. The soft synthetic resin may include soft vinyl chloride resin.

Figure 5A:
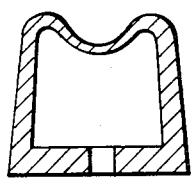
FIGS. 5a, 5b, 6a, and 6b are cross-sections of flexible sheets to be used in this invention, respectively.
Figure 5B:
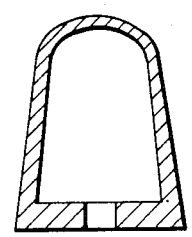
Figure 6A:
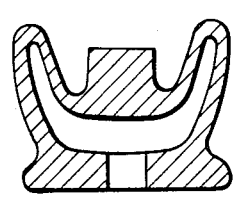
Figure 6B:
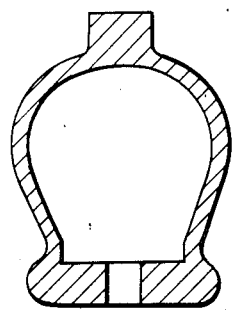

The cross-sectional shape of the flexible sheet is not limited to those shown in FIGS. 1 and 2. It may be possible to take a shape shown in either one of FIGS. 5a and 6a, which can be inflated by introducing pressurized fluid as shown in FIGS. 5b and 6b, respectively.

The apparatus shown in FIGS. 1 and 2 operates as follows: A melted foamable thermoplastic resin composition is extruded from the die 1 and is initially foamed in the sizing die 2. The resin 10 thus foamed is introduced into the vacuum chamber 4. The vacuum chamber 4 is evacuated through the suction hole 5 and simultaneously cooled by a suitable means (not shown). Therefore, if the interior of the vacuum chamber 4 is kept at a predetermined reduced pressure, the resin 10 is further expanded and cooled in the vacuum chamber 4 resulting in a highly expanded foam. Since the chamber 4 is provided at the outlet and/or inlet thereof with the air-shielding device 9, the maintenance of the pressure is achieved after an end of the resin 10 reaches the air-shielding device 9.

That is, the air-shielding device 9 is provided such that it closes the outlet hole of the vacuum chamber 4 except the center portion thereof defined by the flexible sheet 92. The resin 10 is introduced through the inlet hole into the vacuum chamber 4 and then leaves it out through the center hole of the air-shielding device. At this time, since a pressurized fluid is introduced through the fluid inlet 93 into the air-shielding device 9, the flexible sheet 92 is inflated thereby to reduce the area of the center hole. The degree of inflation of the flexible sheet 92 is regulatable arbitrarily by controlling an amount of the pressurized fluid to be introduced thereinto. The frame 91 is formed with a fluid discharge port and/or provided with a relief valve to control internal pressure of the air-shielding device 9 and to prevent excessive pressure increase therein. Therefore, the innermost portion of the flexible sheet 92 can be always in resilient contact with the surface of the extruded resin 10, so that air cannot be introduced into the interior of the vacuum chamber. Thus, the inside of the vacuum chamber 4 is kept at the reduced pressure regardless of continuous passing of the resin 10 having variable configuration and size therethrough. Thus, the resin 10 is further foamed within the vacuum chamber 4 and cooled, resulting in a favorably expanded resin foam.

In the apparatus shown in FIGS. 1 and 2, the flexible sheet 92 is in direct contact with the foamed resin 10. Therefore, as mentioned previously, the flexible sheet 92 is abraded thereby and the life thereof is shortened, causing the necessity of stoppage of the manufacture of the foamed resin due to the replacement thereof by a new one. Another embodiment of the present invention improves this point.

Figure 3:
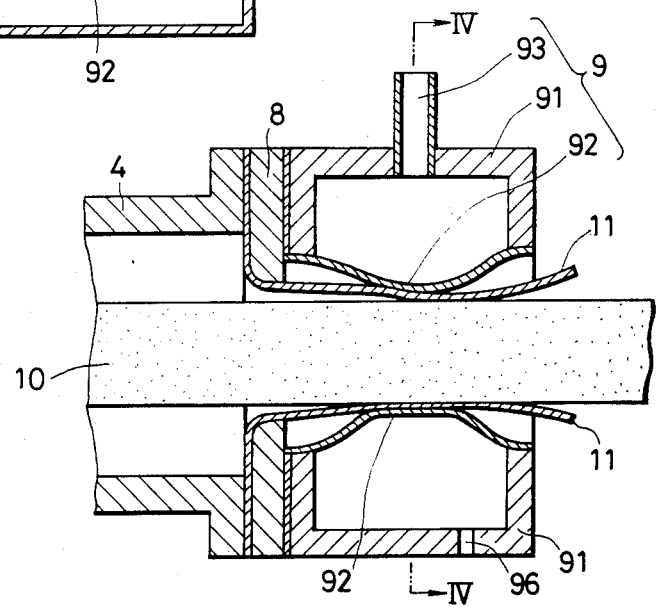
FIG. 3 is a cross-sectional view of an air shielding member and associated portion of another embodiment of the present invention.

The second embodiment has the same construction as the first embodiment shown in FIG. 1, with the air-shielding device being improved. FIG. 3 mainly shows the improved air-shielding device.

The air-shielding device 9 in FIG. 3 is different from that in FIG. 1 only in that a protective sheet 11 is provided on and along the flexible sheet 92. In detail, in FIG. 3, at the outlet of the vacuum chamber 4, the protective sheet 11 is provided, with one end thereof being supported in between a flange of the cylinder constituting the vacuum chamber 4 and the connecting plate 8. The other end of the sheet 11 extends overlapping the surface of the flexible sheet 92.

The protective sheet 11 may be more flexible than the flexible sheet 92. Therefore, the protective sheet 11 is capable of protecting the flexible sheet 92 against abrasion with the resin 10 and of easily following a variation of the varying cross-sectional shape of the resin 10.

A fine metal mesh is one example of a protective sheet 11, which can be made by weaving fine metal wires. Stainless steel wire is suitable for this purpose, and a stainless steel mesh of 50 meshes or more is preferable.

Another example of the protective sheet 11 is a metal foil. Aluminum, lead or copper foil, etc., may be used for this purpose. Such foil can be thin enough to provide a desired flexibility.

A further example of the protective sheet 11 is a cloth of metal fibers. "Nasron" which is a registered trademark of Nippon Seisen Co. for a commercially available stainless steel cloth has a flexibility similar to that of the usual cloth and a very high abrasion durability.

A mesh of plastic filaments may be also used as the protective sheet 11. The plastic material for the mesh should have high abrasion durability and heat resistivity. For example, a polyester resin mesh or polyamide resin mesh may be used.

It is further possible to use an abrasion durable plastic film as the protective sheet 11. Such film may be of ultra-high-molecular-weight polyethylene, polypropylene, polyamide, polyethylene-terephthalate or polytetrafluoroethylene. Such resin is relatively stiff. However, since they may be provided as a very thin film, it can provide a flexibility enough to follow the physical variation of the flexible sheet 92.

The protective sheet 11 may be also of a natural or synthetic fiber cloth. The cloth may or may not be a woven one. The natural fiber may include cellulose such as cotton or jute and the synthetic fiber may include that of vinylon, polyamide, polyethyleneterephthalate, etc. Particularly, a cloth of aromatic polyamide is most preferable. The cloth should be as thin as possible.

Figure 4:
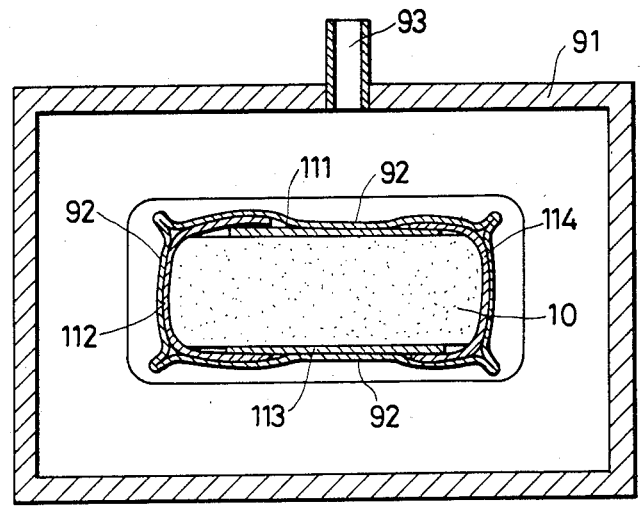
FIG. 4 is a cross-section taken along a line IV—IV in FIG. 3.

The protective sheet 11 is slit to form a plurality of webs connected together at one end thereof. For example, it may comprise four webs as shown in FIG. 4. In FIG. 4, the protective sheet 11 includes upper and lower webs 111 and 113 which are in contact with upper and lower surfaces of the extruded and foamed resin, respectively, and left and right webs 112 and 114 which are in contact with left and right side surfaces of the resin, respectively. The upper and lower webs 111 and 113 are substantially flat in cross-section and webs 112 and 114 are curved in cross-section so that side edges thereof overlap with side edges of the webs 111 and 113, respectively.

The overlapping portions are relatively movable and these webs of the protective sheet always cover the surface of the extruded resin even if the cross-sectional shape and size of the extruded resin 10 varies.

The latter embodiment employs the protective sheet between the flexible sheet and the extruded and foamed resin and, therefore, has a merit of providing an improved durability of the flexible sheet which makes an effective and continuous manufacture of the foamed resin possible, while the merits of the preceding embodiment are maintained as they are.

That is, since the protective sheet is highly flexible, it can easily follow the inflation of the flexible sheet by the pressurized fluid to keep the periphery of the extruded resin air-tight. Further, since the resin contacts with not the flexible sheet but the protective sheet, the abrasion of the flexible sheet due to the rubbing between the latter and the extruded resin does not occur. Therefore, according to this embodiment, there is no need of frequent replacement of the flexible sheet by a new one and thus a continuous manufacture of foamed resin can be realized effectively.

This invention can be applied effectively to the cases where a foaming agent is added to a thermoplastic resin and the mixture is extruded to produce a foamed resin. That is, various thermoplastic resins such as polystyrene, polyethylene, polyvinylchloride and polypropylene, etc., may be used for this purpose. Further, any foaming agent can be used. For example, the aliphatic hydrocarbons such as ethane, propane, butane, pentane, etc., the halogenous hydrocarbons such as methylchloride, methylenechloride, ethylchloride, ethylfluoride, chlorodifluoromethane, dichlorodifluoromethane, etc., or the inert gases, such as carbon dioxide, nitrogen, etc., may be used as the foaming agent. The melted, foamable thermoplastic resin composition means any of these resins which contains any of these foaming agents and is melted by heating.

In this invention, any flat die such as a T die, etc., a circular die or a rod die, etc., may be used as the die.

Although, in the embodiment shown in FIG. 1, the sizing die 2 is disposed between the outlet die 1 and the vacuum chamber 4, the sizing die 2 may be omitted by directly connecting the vacuum chamber 4 to the die 1. In such a case, the extruded resin 10 may be more expanded.

According to the apparatus of this invention, the extruded and foamed resin 10 is kept in contact with the flexible sheet 92 or the protective sheet 11 thereon of the air-shielding device 9 and thus it is possible to keep the vacuum chamber air-tight at the inlet or outlet thereof. Therefore, it is possible to sufficiently foam the extruded resin within the vacuum chamber 4 and to produce the foamed resin effectively continuously. In the case of the embodiment in FIG. 3, the flexible sheet 92 does not directly contact with the extruded resin and thus the abrasion of the flexible sheet is avoided. Therefore, the life of the flexible sheet is elongated and thus the extrusion may be performed continuously for a long time without replacement of the flexible sheet by a new one.

The present invention will be described in more detail with reference to the following examples in which the term "%" means "% by weight".

EXAMPLE 1

The apparatus shown in FIG. 1 together with a tandem type extruder having a diameter of 65-90 mm was used. Polystyrene composition containing 1% talc as a cell size controlling agent was fed into the extruder. From an inlet port provided in the extruder, 8% butane was added into as a blowing agent.

The foamable melt uniformly kneaded within the extruder was extruded at 122° C. through a flat die 1 having a 2.0 mm×100 mm orifice and a sizing die 2. The outlet area of the sizing die 2 was 42 mm×200 mm. A rectangular cylinder 10 m long was used as the vacuum chamber 4, whose inner cross-sectional area was 150 mm×400 mm. An air-shielding device 9 such as shown in FIG. 1 was attached to the outlet of the vacuum chamber. The frame 91 of the air-shielding device 9 was made of iron and the flexible sheet 92 thereof was made of translucent rubber whose thickness was 1 mm. The center open area defined by the flexible sheet 92 through which the extruded and foamed resin 10 passes was 80 mm×280 mm with corner curvature being 10R.

Firstly, a foamed resin was obtained without evacuation of the vacuum chamber and without introducing pressurized air into the air-shielding device. The take-off speed was 2.1 m/minute. The foamed resin was 50 mm thick and 233 mm wide with density being about 0.038 g/cm$^3$.

Then, the pressurized air of 0.65 kg/cm$^2$ was introduced through the pressurized fluid inlet 93 to inflate the flexible sheet 92 to thereby position the latter into intimate contact with the resin 10 while the resin was continuously taken off at 2.4 m/minute and the vacuum chamber is evacuated to 460 mmHg (absolute pressure). Then, the air pressure was reduced to 0.5 kg/cm$^2$. The foamed resin obtained was 55 mm thick and 260 mm wide with the density being about 0.026 g/cm$^3$. Such foamed resin was obtained continuously for 15 minutes.

EXAMPLE 2

Example 1 was repeated except that air-shielding device shown in FIG. 3 was used.

A stainless steel mesh 11 of 300 meshes and 0.1 mm thick was provided between the sheet 92 and the resin 10.

Firstly, a foamed resin was obtained without evacuation of the vacuum chamber and without injecting pressurized air into the air-shielding device. The take-off speed was 2.5 m/minute and the foamed resin thus obtained had a thickness of 48 mm and width of 245 mm, with density being 0.034 g/cm$^3$. Then, pressurized air of 0.65 kg/cm$^2$ was introduced through the pressurized fluid inlet 93 to inflate the flexible sheet 92 to thereby bring the metal mesh 11 into intimate contact with the resin 10 while the resin was continuously taken off at 3.4 m/minute and the vacuum chamber was evacuated to 260 mmHg (absolute pressure). Then, the air pressure was reduced to 0.5 kg/cm$^2$. The foamed resin obtained was 57 mm thick and 275 mm wide, the density being about 0.021 g/cm$^3$ and was continuously obtained for 3 hours.

Thereafter, the inner pressure of the vacuum chamber was increased to 360 mmHg (absolute pressure) and the take-off speed was reduced to 3.1 m/minute, resulting in a foamed resin 55 mm thick and 270 mm wide with the density being about 0.021 g/cm$^3$.

In any of these examples, the foamed resin obtained was stable and it was found that there was no need of varying air pressure to be introduced into the air-shielding device even if the inner pressure of the vacuum chamber was changed from 260 mmHg (absolute pressure) to 360 mmHg (absolute pressure). There was no abrasion of the flexible sheet.

It is readily apparent that the above-described apparatus for producing foamed thermoplastic resin meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for producing a thermoplastic resin foam comprising
   (a) an extruder;
   (b) a die member on said extruder;
   (c) a vacuum chamber airtightly connected to said die, said vacuum chamber member having a discharge end; and
   (d) an inflatable air-shielding means attached to at least the discharge end of said vacuum chamber, said air-shielding means comprising an annular, U-shaped cross-section frame attached to at least the discharge end of said vacuum chamber, said U-shaped cross-section frame having a base portion and two inwardly-directed portions defining an annular opening, a flexible sheet covering said opening and being air-tightly attached to said frame, a flexible protective means provided on and along a radial inner surface of said flexible sheet, and means for introducing pressurized fluid into said frame.

2. An apparatus according to claim 1, wherein said flexible protective means comprises an annular protective sheet having opposite ends, said protective sheet being secured at one end to said chamber and having an opposite end extending to overlap said inner surface of an flexible sheet.

3. An apparatus according to claim 2, wherein said protective sheet is selected from the group consisting of fine metal mesh, metal foil, metal fiber cloth, plastic filament mesh, plastic film, and synthetic fiber cloth.

4. An apparatus according to claim 2, wherein said protective sheet is slit to form a plurality of webs connected together at said one end.

5. An apparatus according to claim 4, wherein said protective sheet is slit to form four webs, which include an upper web, a lower web, a right web and a left web, said upper and lower webs being substantially flat in cross-section and said left and right webs being curved in cross-section having side edges overlapping side edges of said upper and lower webs.

6. An apparatus as set forth in claim 1, wherein said flexible protective sheet is capable of being inflated inwardly together with said flexible sheet upon the injection of said pressurized fluid.

* * * * *